HAROLD J. BUYENS
INVENTOR

ATTORNEY

3,623,331
POULTRY CHILLING
Harold J. Buyens, Western Springs, Ill., assignor to
Swift & Company, Chicago, Ill.
Filed Nov. 20, 1969, Ser. No. 878,270
Int. Cl. F25d 13/06
U.S. Cl. 62—63                                                   9 Claims

ABSTRACT OF THE DISCLOSURE

Poultry carcasses are continuously chilled in one or more troughs comprised of a plurality of vessels holding bodies of chilled liquid (water) through which the carcasses are transported. The vessels have an envelope wall construction formed of two spaced metal sheets, thereby providing passageways for fluid refrigerant which is introduced at the bottom and withdrawn from the top of the vessel. The liquid contained in the vessel is swept across the inner surface to provide for conduction of heat through the wall to the refrigerant.

---

This invention relates to a method and apparatus for processing poultry; and more specifically relates to a novel apparatus and use thereof for chilling and conditioning poultry carcasses.

The poultry industry has been undergoing a revolution in automated processing of birds for the consumer market. At the present time large poultry packing plants are equipped to handle thousands of birds per hour. Following slaughtering, defeathering and evisceration it is necessary to rapidly chill the carcasses so as to avoid bacterial contamination and organoleptic deterioration. Accordingly, a very substantial refrigeration load is created by literally thousands of pounds of poultry that must be chilled each hour.

A recent development for chilling poultry that has met with wide acceptance in the industry is disclosed in the Van Dolah et al. Pat. No. 2,942,429 which discloses that bird carcasses are passed continuously through a plurality of pools of chilled water wherein the birds are simultaneously agitated or tumbled as by oscillating paddles or by rotating drums or reels.

According to the prior art, as suggested by the aforementioned Van Dolah et al. patent, a refrigeration load is serviced by chilling the water and recirculating a substantial portion thereof in each pool. The temperatures maintained in the pools are significant. The water is chilled either mechanically in a unit exterior to the pool and separated therefrom, or by the addition of ice. To date the industry has, in largest measure, utilized ice as the cooling medium; and a usual procedure is to add the ice directly to the pool of water through which the bird is processed.

Ice, however, does involve certain disadvantages. Because the ice must be frozen at a location and then transported to the poultry processing unit there are substantial economic losses due both to melting during transport and to inefficiencies in ice-making machinery. Furthermore, the transport of ice involves a substantial amount of manual handling and exposure to contaminants which may be transferred to the carcasses through the chill water to which the ice is introduced. Where the ice is utilized the packinghouse usually depends upon a supplier or ice-making equipment having a 24-hour capacity just sufficient to meet the usual demands of an 8-hour work shift. Accordingly, where unusually high demands are made on the processing plant, such as by unusually hot weather or extra work turns, the supply of ice may be inadequate thereby causing a loss of product or inability to handle the available product.

Also, it has been observed that where ice has been utilized directly in the pools of water through which the birds are processed the ice has a retarding influence upon the speed at which the machinery can be operated. For example, where the birds are advanced and tumbled through reels or drums that are rotated within a pool of water containing ice there occurs a friction between the reel or drum and ice caught between it and the vessel within which the pool is contained. Similarly, with oscillating paddles ice present in the water hinders the motion of the paddles and dampens the agitation of the fowl carcasses. These retarding influences tend to lengthen requisite carcass chill time in that, within certain limits, increased tumbling and agitation of the fowl carcasses enhances and speeds up the transfer of body heat to the chilled liquid.

Heretofore there have been limited attempts to replace the use of ice with mechanical refrigeration. As aforementioned the Van Dolah et al. Pat. No. 2,942,429 suggests that the liquid from the tanks may be mechanically refrigerated in a unit exterior and apart from the vessels. A more recent development is disclosed in the Morris Pat. No. 3,410,101 wherein a form of reel is utilized as a heat exchanger for a refrigerant circulated through tubing to an exterior mechanical refrigerating unit. However, these prior attempts have also involved certain disadvantages. For instance, where the liquid is refrigerated exterior from the pool there is a cooling loss during transfer of the fluid. Also, the refrigerating unit is difficult to keep clean as it tends to filter and collect debris from recirculated water; and it is difficult to maintain an even temperature within the pool or a desired temperature gradient distributed therethrough. Where the cooling coils are present in the tank itself there is again a very substantial sanitation problem as the surface of the coils must be cleaned regularly. Furthermore, because the more efficient refrigerant materials operate at temperatures below the freezing point of water, there is a tendency, where efficient operation is sought, for a crust or layer of ice to form on the heat exchange members; and such crust will tend to hinder both efficient heat transfer to the refrigerant, and operation of the tumbling or agitating mechanism.

Accordingly, it is a principal object of the present invention to provide an apparatus and method of utilizing same to mechanically refrigerate an entire vessel of water wherein poultry carcasses are agitated and processed.

In brief, the present invention utilizes a tank wall construction wherein an expandable fluid refrigerant such as Freon or ammonia may be circulated and/or expanded to carry away heat from the internal surface of the tank. This wall construction is comprised of a pair of metal sheets spaced from one another by pressing dimples in the exterior sheet and welding the two sheets together where the dimples contact the innermost sheet. The joined sheets are curved to form a U-shaped trough or vessel for containment of liquid; and a manifold is provided along the bottom of the vessel for the introduction of a fluid refrigerant thereto. Suction headers are provided at the uppermost edges of the vessel to withdraw the refrigerant from the space between the two aforementioned metal sheets. An exterior jacket of insulating material is affixed to the convex surface of the structure so as to minimize the exterior heat load. The system is connected to any standard ammonia or Freon refrigerating system of sufficient capacity to handle the anticipated refrigerant load.

The aforementioned structure is uniquely applied where the vessel encloses a means for agitating and tumbling carcasses such as oscillating paddles or a rotating reel or drum. In such an application it has been found that the agitation of the body of water within the vessel causes a sweeping motion across the inner surface of the vessel so as to promote efficient and rapid heat transfer by conduction directly through the surface and to the refrigerant gas and/or liquid moving between the spaced metal sheets rather than by convection currents in the body of water. The sweeping motion of chilled liquid and resultant direct conduction of heat also prevents or minimizes the formation of ice on the inner surface of the vessel. It has been observed that if there is a formation of such ice, it is so minimal that it does not tend to insulate the body of water from the colder metal surface. Moreover, minimum ice clading and absence of pieces of floating ice have permitted the agitators, particularly reels and drums, to be operated at higher speeds than heretofore practiced with the result that the carcasses are agitated and tumbled at a higher rate and heat is transferred therefrom more rapidly to reduce the total time required for chilling such carcasses.

Further objects and advantages of the present invention will become apparent to the reader upon pursuing the following detailed description in conjunction with the drawings wherein.

Figure 1:
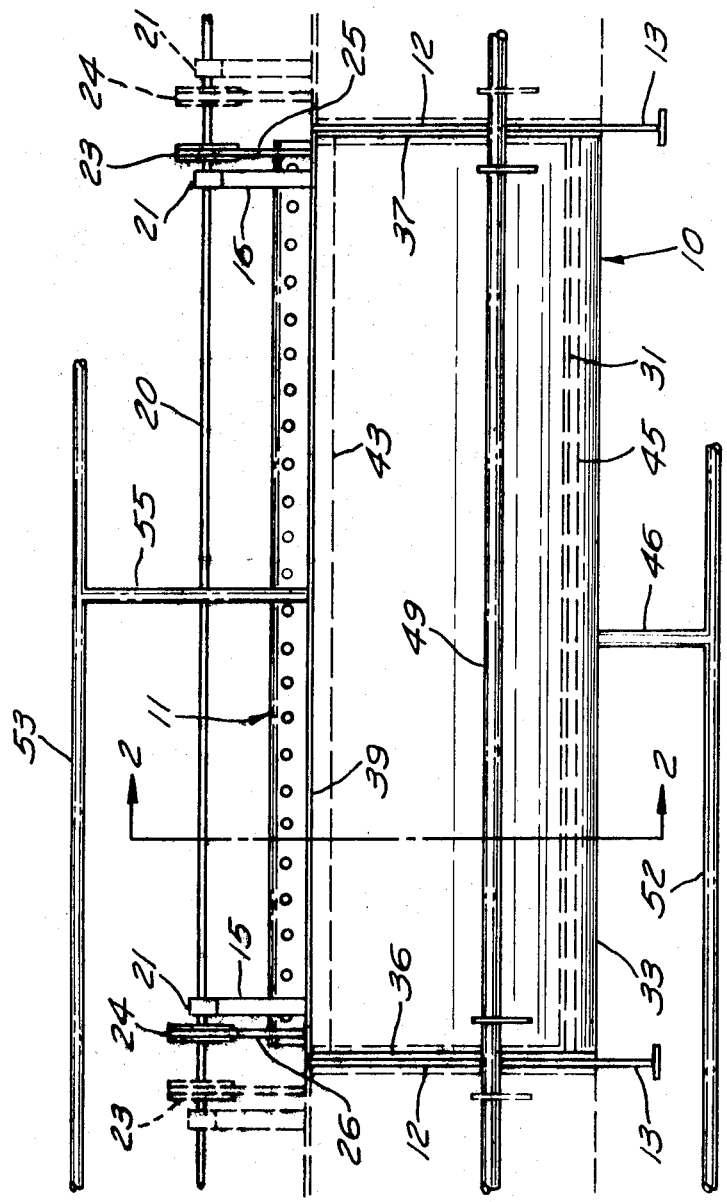
FIG. 1 is a side elevation of an apparatus of the present invention comprising a unit of a refrigerated vessel, and an agitating reel therein, attached at each end to further similar units.

Referring in greater detail to FIG. 1 of the drawings illustrating a preferred embodiment of the invention it may be seen that a number of metal vessel units generally 10, are connected longitudinally in series to form an elongated trough within which is suspended a means for agitating and propelling poultry carcasses therethrough. Preferably such means comprise a similar number of rotatable drums, generally 11, of length substantially equal to the vessels, which are similarly connected together to form a continuous reel or drum for tumbling poultry carcasses.

Figure 2:
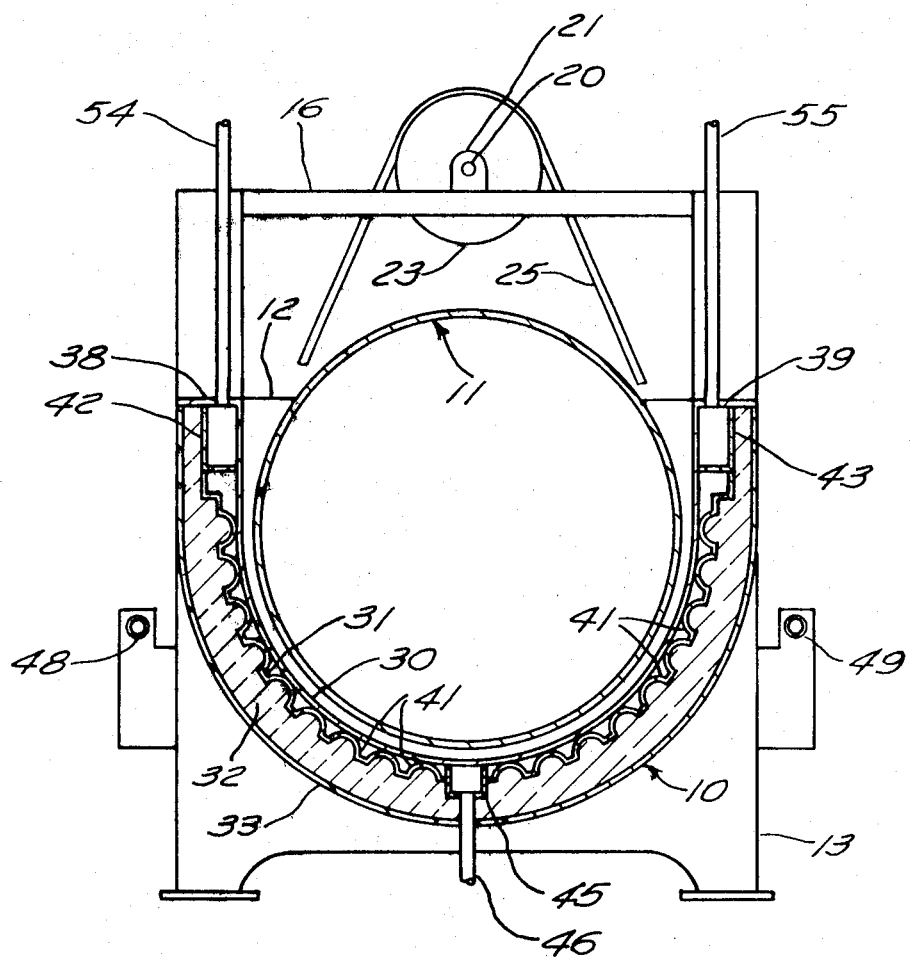
FIG. 2 is an end elevation in section of the apparatus of FIG. 1 taken at line 2—2 therein, showing the structure of the vessel wall.

Each vessel 10 is constructed as an independent unit and is separated at each end from an adjacent vessel by a bulkhead 12 which closes the inner contour of each vessel except for a circular opening through which the drums, generally 11, are connected one to another. Also located at each bulkhead juncture of two vessel units, generally 10, is a pedestal 13 to support the unit above floor level. The pedestal 13 and bulkhead 12 may be an integral unit, as shown in FIGS. 1 and 2, formed primarily from a single vertical metal plate. Also each vessel, generally 10, includes cross-bar superstructures 15 and 16 at both ends spaced slightly from the juncture with the bulkhead 12. These superstructures rigidly attach to both sides of each vessel and serve two functions, e.g., to stabilize the vessel structure, and to support drive and suspension means for the drums, generally 11.

Referring to FIGS. 1 and 2 it will be seen that a long overhead shaft 20 extends the length of the trough and is journaled in a plurality of pillow bearings 21 fastened above the center of each superstructure 15, 16, etc. Fixed to the shaft between each pair of adjacent superstructures of joined vessels are a pair of sheaves 23, 24 from which the ends of the drums, generally 11, are suspended by drive belts 25, 26, respectively, that are trained in peripheral channels (not seen in the drawings) circumscribing each end of each drum. If desired sprockets and chains or other equivalent means may be substituted for the sheaves and belts illustrated. Thus, each drum 11 will be drivingly suspended within each vessel, generally 10, and spaced from the interior walls thereof. All of the drums aligned within a trough will be driven at the same speed by a drive motor engaged through a suitable drive train (neither shown in the drawings) with the shaft 20.

If desired, the plurality of drums, generally 11, may be directly joined one to the other by bolts and the like, but this is not necessary—particularly where driven at equal speeds. Also, the drums may be partially supported by bearings on the bulkheads 12; but this too is not necessary where each end is suspended from an overhead drive shaft. It is preferred that each drum have a perforated surface to permit rapid exchange of liquid between the interior thereof and the space between the drum 11 and interior surface of vessel 10. Also it is preferred that each drum contain internal means for partially lifting, turning and tumbling poultry carcasses passing longitudinally therethrough as, for instance, by helically positioned vanes (not shown) which also impart a directional longitudinal movement to both the liquid and carcasses. Also it will be understood from the prior art that the first and last drums in a given trough comprised of a plurality of the above described units may be foreshortened in length, as compared to the respective vessel so as to provide for equipment to facilitate the ingress and egress of poultry carcasses.

The foregoing description may generally apply to poultry chilling equipment heretofore known to the art; and it is to be understood that such prior art equipment, per se, does not constitute the present invention. This invention is, however, comprised of the features disclosed hereinafter, individually, and in combination with the prior art.

The vessels, generally 10, are constructed to be directly refrigerated by recirculating chilled liquid refrigerant or by expanding a refrigerant liquid to gaseous phase within the vessel wall structure. The cooling effect may be accomplished in a twofold manner. Primarily, and preferred, the refrigerant in liquid phase is of sufficiently low temperature to absorb the heat from the vessel and remain in liquid phase. However the heat load may be such as to be absorbed by vaporizing the refrigerant at certain locations along the vessel, particularly in areas where liquid circulation may be poor. If desired substantially the entire heat load may be absorbed by expanding all of the refrigerant. FIG. 2 being in section illustrates the vessel structure. To accomplish this each vessel, generally 10, is comprised of a multi-layer wall structure having an inner surface 30, an intermediate envelope wall 31, a layer of thermal insulation 32 and an outer protective sheath 33. Preferably the inner surface 30, envelope wall 31, and sheath 33 are fabricated from stainless steel sheet for resistance to corrosion and ease of cleaning and mintenance.

The inner surface 30 is bent to arcuate U shape of a radius larger than the drum, generally 11; and the envelope 31 and sheath 33 are similarly bent to concentric form. Additionally, the inner surface 30 is bent outwardly at right angles at each end to form mounting flanges 36, 37 which are bolted together with the bulkheads 12 and corresponding flanges on adjacent vessels to form the trough. Similarly, the inner surface 30 is bent outwardly at right angles along each longitudinal edge to form top flanges 38, 39.

The envelope wall 31 is preferably spaced from the inner surface 30 by a great plurality of small dimples 41 that are uniformly spaced and pressed in the envelope wall 31. Small spot welds at each dimple 41 rigidly combine the two layers to form an integral structure. The two members are also welded together in continuous seams at the mounting flanges 36, 37; and both are also joined by welds to a pair of longitudinal suction headers 42, 43 beneath top flanges 38, 39, respectively. The aforedescribed structure of inner surface 30 and envelope wall 31 provides a multiplicity of spaces and passageways through which a refrigerant liquid may circulate and absorb heat, and under some conditions also expand and absorb heat. Introduction of such a liquid is provided for by a liquid header manifold 45 extending the full length of each vessel along the bottommost portion thereof. The liquid header 45 may be constructed in any one of several ways such as by being formed directly in the envelope wall 31, or being a separate pipe or enclosed channel member either fastened between the inner surface 30 and envelope wall 31 or on the outer surface of the latter. It will be understood that the liquid header 45 is a substantially closed member having one or more infeed pipes 46 and a plurality of ports (not shown) to the space between the inner surface 30 and envelope wall 31.

Figure 3:
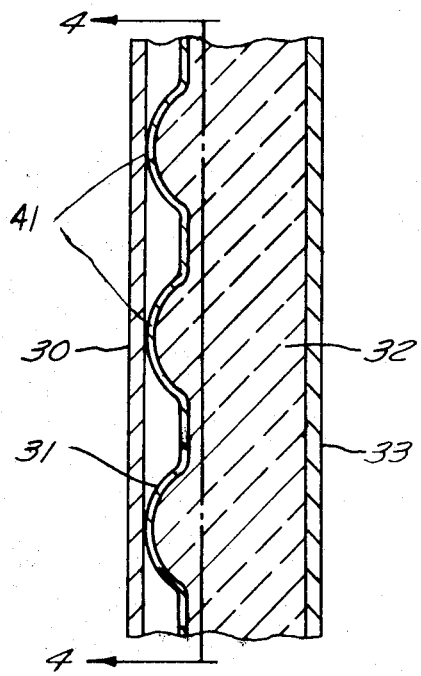
FIG. 3 is a detailed end section view of a portion of the vessel wall structure shown in FIG. 2.
Figure 4:
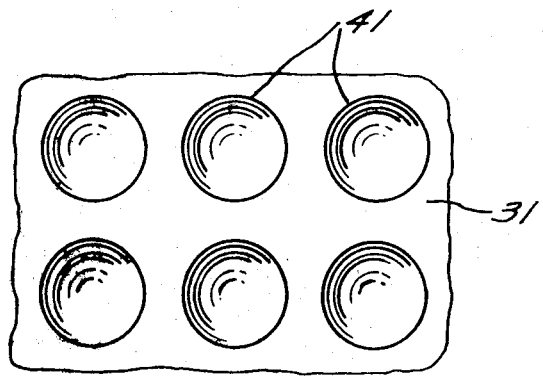
FIG. 4 is a detailed side view in section of that portion of the apparatus shown in FIG. 3, taken at line 4—4 therein.

As may be seen in FIGS. 2 and 3 the envelope wall 31 is completely overlayed with a blanket of insulation 32 to minimize the exterior heat load on the vessel. A two inch layer of fiberglass has been found suitable; however, other insulation such as mineral wool and plastic foam in adequate thickness would also be suitable. It has also been found preferable to encase the vessel in the outer sheath 33 to protect against possible damage of the envelope wall 31 and/or displacement of the insulation layer 32. The outer sheath 33 is also desirable from the standpoint of sanitation and clean-up requirements in food processing plants.

For additional protection it is desired to also provide bumper rails 48, 49 at each side of the vessels, generally 10.

Figure 5:
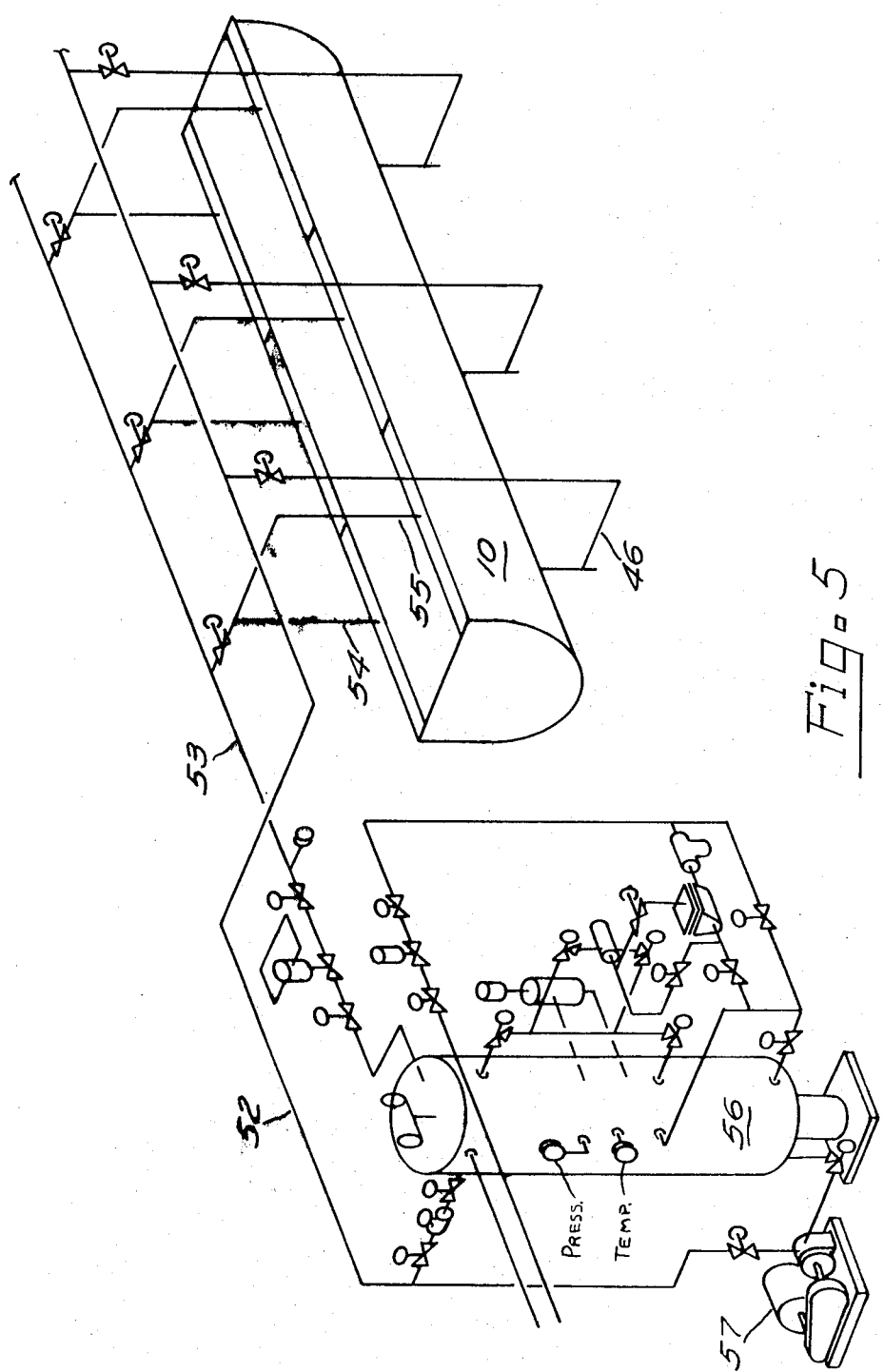
FIG. 5 is a diagrammatic view of a suitable refrigerant system for the apparatus shown in the figures.

Refrigerant is cycled to each unit by substantially conventional means as shown in FIG. 5. Each unit or vessel 10 is connetced in parallel to a pressurized liquid line 52, by one or more infeed pipes 46 to the liquid headers 45, and to a suction line 53, by at least one suction pipe 54, 55 from each suction header 42, 43, respectively. The usual expandable refrigerants such as ammonia or a Freon are suitable; and if the present invention is to be used in a plant having an existing refrigerant system the liquid line 52 and suction line 53 can be connected thereto. The embodiment illustrated in FIG. 5 is such a system for ammonia and includes dual chamber circulation tank 56 which is connected to the plant ammonia supply and return system. Liquid line 52 is connected to the bottom chamber of tank 56 through an ammonia pump 57; and suction line 53 is connected with the upper chamber of the tank 56. Usual valving for control and pressure relief purposes is provided at the tank 56 and at all infeed pipes 46 and suction pipes 54, 55.

A typical installation for chilling turkeys utilizes a number of such vessels, as hereinbefore described, assembled in two troughs or stages for pre-chilling and final chilling the carcasses. Initially the temperature of the carcasses is close to 95° F. and economical pre-chilling may often be undertaken with normal tap water without refrigeration where the temperature of the water is no greater than 60° F. If the water supply is of higher temperature it is advantageous to provide sufficient refrigeration to lower the temperature of the water to between about 45°–60° F. A number of vessels are joined together in the pre-chilling trough to allow a transit time of about 10–20 minutes per carcass which is normally adequate to cleanse the carcass, condition and moisturize the skin and flesh, and lower the temperature of turkey carcass to about 70°–80° F. A series of four vessels, each ten feet in length, has been utilized. Due to the cleaning function it is important to provide an adequate continuous flow of fresh make-up water in the trough and to discharge an equal flow of used water. Normally, this is done counterflow to the movement of birds, with a water faucet at the discharge end of the trough and a drain at the loading end; although separate supplies and drains may be provided at each vessel if desired (the water plumbing is not shown in the drawings).

A second or final chilling trough also requires a plurality of vessels wherein the refrigerant flow should be regulated to maintain water in each vessel at about 33°–35° F. Turkey carcasses are preferably exposed to the final chill for about 20–40 minutes and the temperature reduced to about 45–55° F. For this stage a series of six vessels, each ten feet in length, has been adequate. While make-up water requirements are less in this stage, because most cleansing occurs in the pre-chill, a quantity of fresh water should be continuously added and used water discharged in a manner similar to the pre-chill stage. The temperature requirements for the chill water and the heat load applied by the carcasses and make-up water will usually require that the inner surface 30 of each vessel 10 in the final chill trough be maintained at a temperature substantially below freezing. Adequate refrigerant is provided by adjusting the liquid line and suction line control valves to obtain the desired equilibrium condition in the water in each vessel 10.

Chickens and other poultry may be similarly processed, although it will be understood that the specific temperature and time conditions may be altered. For instance in the processing of broilers shorter times will usually be sufficient in the cooling troughs, and a final product temperature of about 35° F. is preferred.

When operating under the above described conditions in either chill stage it has been found, surprisingly and contrary to original expectations, that there is no significant build-up of ice on the interior of the vessel and there is no free ice floating in the water. Also, there has been no tendency for free fat, which is to some degree flushed from the body cavities of the carcasses, to congeal upon the refrigerated surfaces of the vessel.

Obviously many modifications and variations of the invention as hereinbefore set forth may be made without departing from the spirit and scope thereof, and, therefore, only such limitations should be imposed as are indicated in the appended claims.

I claim:

1. An apparatus for chilling poultry carcasses wherein a body of cooling water is maintained in a trough and the carcasses are passed longitudinally therethrough while being agitated therein, and wherein the trough comprises at least one vessel, said apparatus comprising: a pair of metal sheets of arcuate shape to form the wall of said vessel; means attached between said sheets to space them respecting one another so as to provide a multiplicity of spaces and passageways therebetween; means to introduce refrigerant between said sheets throughout the length of said vessel at the lowermost portion thereof; means to withdraw refrigerant from between said sheets throughout the length of said vessel at the highest portions thereof; means to control the rate of introduction and withdrawal of said refrigerant; and a drum rotatably supported within the vessel, said drum being rotatable to agitate the body of chilling water in said vessel so as to sweep said water across the inner surface of said vessel.

2. The apparatus of claim 1 wherein the pair of metal sheets are congruent with the innermost sheet being smooth and forming the inner surface of said vessel and the other sheet having a plurality of uniformly spaced dimples pressed therein in the direction of said inner surface so as to space same to form an envelope wall exterior of said inner surface.

3. The apparatus of claim 2 wherein the envelope wall is incased in an outer layer of thermal insulation and a protective sheath.

4. The apparatus of claim 1 wherein the vessel is of U-shaped cross-section having a bottom and two sides and a header manifold is connected to the space between said sheets along the length of the bottom of said vessel, and suction headers are connected to the spaces between said sheets along the length of the top of both sides of said vessel.

5. The apparatus of claim 2 wherein the pair of metal sheets are of U-shaped cross-section having a bottom and two sides and a header manifold is connected to the space between said inner surface and said envelope wall along the length of the bottom of said vessel, and suction headers are connected to the spaces between the inner surface and envelope wall along the length of the top of both sides of said vessel.

6. A method for chilling poultry carcasses within a body of cooling water maintained in a trough of a plurality of contiguous vessels wherein the carcasses are agitated while being passed longitudinally therethrough, said method comprising: chilling the inner surfaces of said contiguous vessels independently, to remove the heat imparted to said cooling water from said carcasses, by passing across substantially the entire exterior of each of said surfaces a fluid refrigerant material; simultaneously and continuously moving the cooling water across the inner surfaces of said vessels so as to remove heat therefrom primarily by conduction and to hinder any tendency to form ice on said inner surfaces; and regulating the flow of refrigerant material across the exterior of said surfaces in accordance with the temperature of the body of cooling water.

7. The method of claim 6 wherein the flow of fluid refrigerant is confined while passing across the exterior of said surface.

8. The method of claim 6 wherein the body of cooling water is maintained between 32°–60° F.

9. A method for chilling poultry carcasses within a body of cooling water maintained in a trough of at least one vessel wherein the carcasses are agitated while being passed longitudinally therethrough, said method comprising: chilling the inner surface of said vessel, to remove the heat imparted to said cooling water from said carcasses, by passing across substantially the entire exterior of said surface a fluid refrigerant material; simultaneously and continuously moving the cooling water across the inner surface of said vessel so as to remove heat therefrom primarily by conduction and to hinder any tendency to form ice on said inner surface, said cooling water being continuously moved across the inner surface of said vessel by tumbling the poultry carcasses within a drum, said drum being rotatably supported within said vessel; and regulating the flow of refrigerant material across the exterior of said surface in accordance with the temperature of the body of cooling water.

References Cited
UNITED STATES PATENTS

| | | | |
|---|---|---|---|
| 2,740,269 | 4/1956 | Buehler, Jr. | 165—169 |
| 3,240,026 | 3/1966 | Van Dolah et al. | 62—64 |

MEYER PERLIN, Primary Examiner

R. C. CAPOSSELA, Assistant Examiner

U.S. Cl. X.R.

62—64, 374